March 1, 1960

S. F. ANDERSON ET AL 2,926,974

BALANCING WAY

Filed Oct. 17, 1957

Inventors
Swan F. Anderson
Ralph F. Anderson
By McCanna, Morsbach & Pillote
Attys.

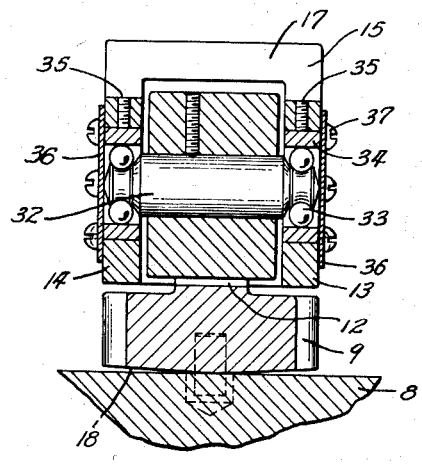
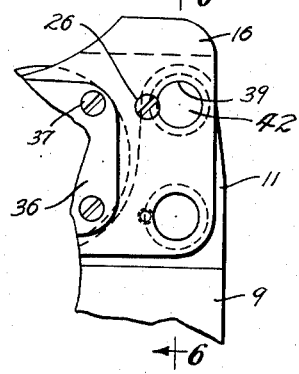
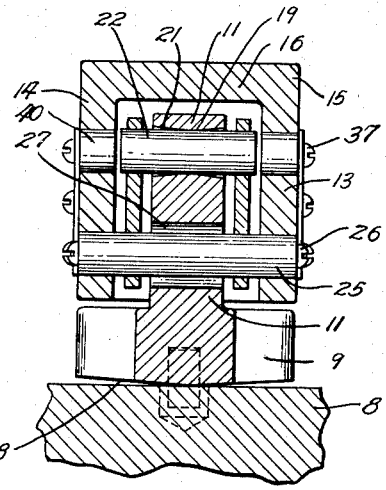
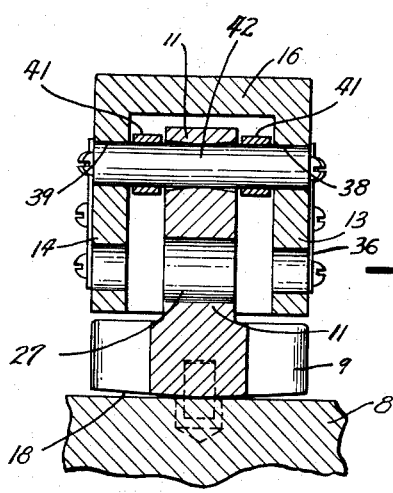

United States Patent Office 2,926,974
Patented Mar. 1, 1960

2,926,974

BALANCING WAY

Swan F. Anderson and Ralph F. Anderson, Rockford, Ill.

Application October 17, 1957, Serial No. 690,859

12 Claims. (Cl. 308—203)

This invention relates to balancing devices and statically and dynamically balancing rotary devices having protruding shafts or circular parts.

An important object of the invention is the provision of a balancing way of simple and improved construction which is self-aligning with respect to the shaft or other rotary member mounted thereon for balancing.

Other objects are the provision of a balancing way of greater utility and greater versatility which need not be bolted or otherwise affixed to its support and which can be used for balancing of heavy objects without damage thereto or to the shafts or trunnions thereof.

Other objects and advantages will appear from the following description and the accompanying drawings in which:

Fig. 3 is a section on the line 3—3 of Figure 1;

Fig. 4 is a section on the line 4—4 of Figure 1;

Fig. 5 shows a modified arrangement used in the balancing of heavier objects and suitable for static balancing, and Fig. 6 is a section on the line 6—6 of Fig. 5.

Figure 1:
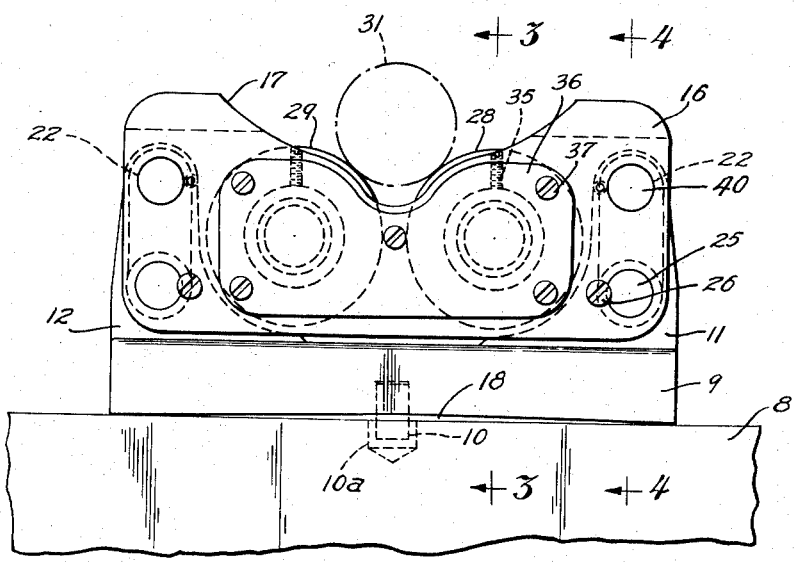
Figure 1 is a side elevation of a balancing way embodying the invention.
Figure 2:
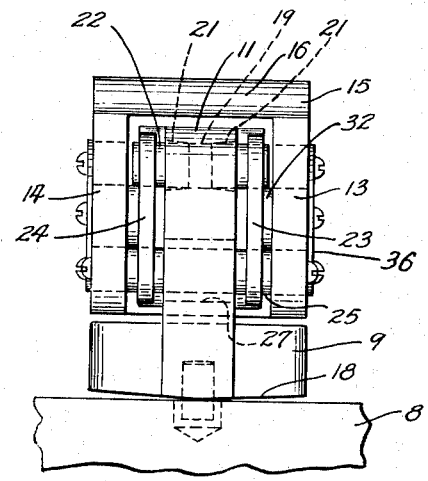
Fig. 2 is an end elevational view thereof.

In the drawings, the numeral 8 indicates a suitable support on which the device is placed for use. This may consist of a metal frame designed specifically for the purpose or it may be a table or pedestal of other type depending upon the dimensions of the objects to be balanced by means of the way. The device comprises a frame which in this embodiment includes a base member 9 having upstanding arms 11 and 12 extending upwardly from its opposite ends and an upper frame member indicated generally by the numeral 15 having a pair of side walls 13 and 14 and cross walls 16 and 17 interconnecting the walls 13 and 14 above the upstanding arms 11 and 12. The side walls are substantially co-extensive in length with the base 9 and form therewith a frame which is of general rectangular shape and is of substantially greater length than either width or height as will be seen from a comparison of Figs. 1 and 2. The lower or bottom face of the base 9 has means projecting downwardly from the lower face, intermediate its side edges, so that the base and frame may rock about a line extending longitudinally thereof. In the embodiment shown this takes the form of a rib extending longitudinally thereof indicated by the numeral 18 which is of V-shape cross-section so that the base is capable of rocking transversely when the base is placed upon a flat surface such as the upper surface of the support 8. The rib 18 may extend the full length of the base as shown or may be interrupted in the center portion of the base since all that is required are two spaced projecting points preferably located adjacent opposite ends of the base. A pin 10 may project from the bottom of the base for reception in an enlarged opening 10a in the table to prevent the base from creeping or the base may be bolted down if preferred.

Each of the upstanding arms 11 and 12 has a bore adjacent its upper end extending completely therethrough in a transverse direction, the axes of the bores in the two arms being parallelly disposed. Each of the bores has a central cylindrical bearing portion indicated at 19 and outwardly flared end portions as indicated at 21. Positioned in each of the bores is a bearing pin 22 of slightly smaller diameter than the bearing portion 19 so that it may tilt slightly in the bore within the limits defined by the flared portions 21, the ends of the pin extending outwardly beyond the arms. Carried on the outer ends of the pins are links 23 and 24. The lower ends of the links 23 and 24 have openings for the reception of cross pins 25 pivotally supported on the links, the cross pins having their ends mounted in the walls 13 and 14 and being retained therein by retaining screws 26. The upstanding arms 11 and 12 are provided with enlarged openings 27 through which the cross pins 25 pass whereby the pins may have substantial movement about the axis of the pins 22 as the links swing in an arc. The side walls 13 and 14 are provided with openings 38 and 39 for the passage of the pins 22, and for a further purpose presently to be described, and receive plugs 40 suitably retained in position as by friction fit. It will therefore be seen that the upper frame member is wholly supported on the base member 9 through the upstanding arms 11 and 12, the two cross pins 22, the two pairs of links 23 and 24 and the two cross pins 25 which enables the upper frame member to swing in a direction lengthwise of the frame.

Mounted between the side walls 13 and 14 are two rollers indicated generally by the numerals 28 and 29, these rollers being disposed in parallel relation and suitably spaced so that a shaft of a device to be balanced such as indicated by the numeral 31 will rest on each of the rollers when disposed thereon with its axis in substantially parallel relationship with the axis of the rollers. In the embodiment herein shown each of the rollers has a centrally disposed shaft 32 having trunnion portions projecting from the ends of the roller and of a length to extend substantially through the side walls, a portion of the projecting ends being formed into raceways for the reception of ball bearings 33 which bear against an outer race 34 retained in position in the side wall by suitable set screws 35. The bearing assembly is covered by a plate 36 retained in position by suitable screws 37 as will be apparent from Figure 1. The rollers 28 and 29 should be of substantially equal radius and should have a length somewhat greater than the radial dimension of the roller so as to present a wide face against the shaft of the object to be balanced. Furthermore, the rollers should be of relatively small radius so that the overall height of the balancing way is substantially less than its length in order to lend stability to the device.

In use an object to be balanced is placed upon two of these ways arranged in spaced relation so that the shaft or trunnions 31 of the object to be balanced can rest upon the two ways. The frames can thereafter be adjusted by turning about the vertical axis thereof until the axes of the two rollers come into substantial parallelism with the axis of the shaft 31. However, it will be seen that because of the shape of the bore or opening in each of the arms 11 and 12 the pins 25 can make some adjustment for minor irregularities in one direction. Likewise the frame can tilt about the rib 18 in order to make further adjustment, thereby bringing the rollers into parallelism with the shaft. If the object is out of balance the shaft 31 and the rollers 28 and 29 will rotate on the anti-friction bearings until the heavy part of the object reaches the lower side. This enables the operator to make suitable adjustments, either by removing material from one side of the object or adding weight to the other side in the usual manner. On the other hand, when the object 31 is rotated at a fairly rapid rate of speed, any dynamic unbalance will appear because the upper portion of the frame will swing laterally back and forth on the links 23 and 24 making the dynamic balance and, to a certain extent its magnitude, apparent from this movement.

Where the device is to be used primarily for the purpose of determining static balance the ports are arranged as shown in Figs. 5 and 6 wherein the links 23 and 24, the pins 25 and the plugs 40 are eliminated and a pin 42 passed through holes 38 and 39 in the side walls 13 and 14 and also through the upper opening in the arms 11 and 12 with the ends of the pins anchored in the side walls, thereby eliminating the swinging movement permitted by the links 23 and 24. Spacer washers 41 are disposed on the pins 42 to hold the upper frame member centered with respect to the arms 11 and 12.

We claim:

1. A balancing way comprising in combination, a frame of substantially greater length than width having upstanding arms adjacent opposite ends thereof and an upper frame member having spaced side walls disposed on opposite sides of said arms in spaced relation thereto and connecting cross walls adjacent the ends of the side walls, a pair of spaced rollers disposed between said side walls in spaced relation to the ends thereof, anti-friction bearings for mounting the ends of the rollers in the side walls, said rollers being of greater length than radius, and means for mounting the upper frame member on the arms comprising pins extending through the side walls adjacent each end of the side walls and supported on said arms.

2. The combination of claim 1 wherein the means for mounting the upper frame member on the arms comprises bearing pins passing through each of said arms, the arms having bores for the bearing reception of said pins, crosspins mounted in the side walls, spanning the space therebetween, and parallel links pivotally interconnecting the crosspins with the ends of the bearing pins, whereby the upper frame member may swing with respect to the base in response to dynamic unbalance of a shaft supported on the rollers in balancing position.

3. The combination of claim 1 wherein the means for mounting the upper frame member on the arms comprises bearing pins passing through each of said arms and through said side walls, said arms having bores for the bearing reception of said pins.

4. The combination of claim 1 including means providing tilting movement of the rollers in vertical planes under the pressure of a shaft disposed in balancing position thereon, to bring the rollers into supporting contact with the shaft throughout their length.

5. The combination of claim 2 wherein said bores are tapered inwardly from each end toward the center of the bore for limited tilting movement of the pins therein, for tilting movement of the upper frame member and rollers under the pressure of said shaft to bring the rollers into supporting contact with the shaft throughout their length.

6. The combination of claim 1 including means at the lower face of the base, intermediate the side edges thereof providing an axis about which the base may tilt under the pressure of a shaft disposed in balancing position on the rollers, to bring the rollers into supporting contact with the shaft throughout their length.

7. The combination of claim 5 including a rib of V-shaped cross-section on the lower face of the base, extending lengthwise thereof, positioned to rest upon a flat support for tilting movement of the way on the rib in response to the pressure of said shaft, to cooperate in bringing the rollers into supporting contact with the shaft.

8. The combination of claim 1 including a rib of V-shaped cross-section on the lower face of the base extending lengthwise thereof and positioned to rest upon a flat support for tilting movement of the way on the rib in response to pressure of a shaft supported on the rollers in balancing position to bring the rollers into supporting contact with the shaft throughout their length.

9. The combination of claim 3 wherein said bores are tapered inwardly from each end toward the center of the bore for limited tilting movement of the pins therein and tilting movement of the upper frame member and rollers under the pressure of said shaft to bring the rollers into supporting contact with the shaft throughout their length.

10. The combination of claim 9 including a rib of V-shaped cross-section on the lower face of the base extending lengthwise thereof, positioned to rest upon a flat support for tilting movement of the way on the rib in response to the pressure of said shaft, to cooperate in bringing the rollers into supporting contact with the shaft.

11. A balancing way comprising in combination a frame including a base of substantially greater length than width or height and spaced side walls connected to and supported on the base, said side walls extending longitudinally of the base, a pair of rollers disposed in substantially parallel spaced relationship between the side walls, said rollers being of equal radius and each having a length greater than its radial dimension, trunnions at opposite ends of said rollers extending into the side walls, anti-friction bearings disposed between the trunnions and the side walls for rotatably supporting the rollers, and a rib of V-shaped cross-section on the lower face of the base extending lengthwise thereof and positioned to rest upon a flat support for tilting movement of the way on the rib in response to pressure of a shaft spanning the space between the rollers and resting thereon, to align the rollers with respect to the shaft.

12. The combination of claim 1 wherein the rollers are mounted on the upper frame so that the peripheries thereof are in close proximity to the upper side of the base and the upper edges of the side walls are recessed itnermediate their ends to expose the surface of the rollers.

References Cited in the file of this patent

UNITED STATES PATENTS

| 336,341 | Morehouse | Feb. 16, 1886 |
| 1,429,606 | Marsland | Sept. 19, 1922 |
| 2,399,189 | Johnson | Apr. 30, 1946 |
| 2,399,446 | Morgan | Apr. 30, 1946 |